(12) United States Patent
Gomez (10) Patent No.: US 9,687,861 B1
(45) Date of Patent: Jun. 27, 2017

(54) RATCHETING SHOWER HEAD VALVE (71) Applicant: Jesús A. Gomez, Bakersfield, CA (US)

(72) Inventor: Jesús A. Gomez, Bakersfield, CA (US)

( * ) Notice: Subject to any disclaimer, the term of this patent is extended or adjusted under 35 U.S.C. 154(b) by 0 days.

(21) Appl. No.: 15/073,981

(22) Filed: Mar. 18, 2016

Related U.S. Application Data (60) Provisional application No. 62/136,368, filed on Mar. 20, 2015.

(51) Int. Cl.
F16K 5/06 (2006.01)
B05B 1/18 (2006.01)
B05B 1/30 (2006.01)
F16K 31/46 (2006.01)
F16K 31/44 (2006.01)

(52) U.S. Cl.
CPC ............ B05B 1/185 (2013.01); B05B 1/3026 (2013.01); F16K 5/0605 (2013.01); F16K 31/44 (2013.01); F16K 31/46 (2013.01)

(58) Field of Classification Search
CPC ....... B05B 1/185; B05B 1/3026; F16K 31/46; F16K 5/0605; F16K 31/44
USPC .... 251/207, 230, 315.01–315.16; 239/585.1; 4/615; 137/625.17
See application file for complete search history.

(56) References Cited

U.S. PATENT DOCUMENTS

| | | | | |
|---|---|---|---|---|
| 2,965,313 A * | 12/1960 | Jay | ............................. | E03C 1/08 239/581.1 |
| 3,115,896 A * | 12/1963 | Roberts | ................. | F16K 11/085 137/556.6 |
| 3,386,461 A * | 6/1968 | Fisher | ....................... | F16K 5/10 137/237 |
| 4,130,128 A * | 12/1978 | Kaneko | ................. | F16K 5/0605 251/207 |
| 4,427,177 A * | 1/1984 | Constantinescu | ..... | F16K 5/0647 251/230 |
| 5,613,639 A * | 3/1997 | Storm | ................... | F16K 5/0605 239/581.1 |
| 5,944,051 A * | 8/1999 | Johnson | ................. | A62C 37/50 251/207 |
| 7,219,877 B1 * | 5/2007 | Mogas | .................. | F16K 5/0605 251/207 |
| 7,503,345 B2 * | 3/2009 | Paterson | ............... | F16K 5/0407 137/625.47 |

(Continued)

Primary Examiner — John Bastianelli
(74) Attorney, Agent, or Firm — James M. Duncan, Esq.; Klein DeNatale Goldner (57) ABSTRACT A shower head valve may be alternated between a high flow configuration to a low flow configuration. A valve body in the invention has a flow inlet, a flow outlet, and a communication portion formed between the flow inlet and the flow outlet. A ball is disposed within the communication portion of the valve body, where the ball is an oblong spheroid having a first axis and a second axis, with the first axis perpendicular to the second axis. The ball has a first passage axially aligned with the first axis and a second passage axially aligned with the second axis. The ball is positionable from a first position in which the first passage is in alignment with the flow inlet and the flow outlet, to a second position in which the second passage is in alignment with the flow inlet and the flow outlet. The liquid volume which may pass through the valve body over a given time when the ball is in the first position is at least twice as large as the volume which may pass through the valve body for the same time when the ball is in the second position.

6 Claims, 11 Drawing Sheets (56) References Cited

U.S. PATENT DOCUMENTS

| | | | | |
|---|---|---|---|---|
| 7,694,359 B1* | 4/2010 | Hall | ............... | E03C 1/0408 4/615 |
| 2009/0032533 A1* | 2/2009 | Kessell | ............. | A47G 19/2266 251/309 |
| 2012/0305116 A1* | 12/2012 | Zhou | ............... | B05B 1/1636 137/625.46 |

* cited by examiner

RATCHETING SHOWER HEAD VALVE

RELATED APPLICATION

U.S. Application No. 62/136,368 for this invention was filed on Mar. 20, 2015, for which application this inventor claims domestic priority, and which application is incorporated herein in its entirety.

BACKGROUND OF THE INVENTION

Ongoing and past drought events have demonstrated the need for water conservation. In the area of water consumption by individuals and their families, various practices are encouraged to save water, such as low flow toilets, low flow shower heads, reducing shower time, etc. With respect to low flow shower heads, the consumer can be caught between trying to conserve water and the frustration of showering with a flow which lacks sufficient volume or energy to completely rinse soap or shampoo from the user's body and hair.

As an alternative to low flow shower heads are those which have adjustable flow rates. Typically, these shower heads have a valve located on or adjacent to the shower head which allows the user to reach up and reduce or increase the flow rate by adjusting the valve. Some of these valves completely turn off flow to the shower, while others simply reduce the flow. However, it is often desirable to maintain some flow in the shower so that the user may keep warm and/or to maintain the water temperature flowing through the shower head.

With a reduced flow valve, a user, for example, may reduce the flow rate while washing his or her hair, shaving, etc. However, once those tasks are accomplished, it is typical to return flow to a full rate to rinse and finish showering. However, because these valves are located on or adjacent to the shower head, they may not be operable by someone not tall enough to reach the valve handle, children in particular. Moreover, the valve handles can become tight or frozen and therefore difficult to operate. The valve handles may also require a significant number of turns to increase or decrease the flow volume. Obtaining the desired volume when readjusting the valve may also be problematic.

SUMMARY OF THE INVENTION

The present invention provides a solution to the problems identified above. The present invention provides a shower head valve which may be alternated between a high flow configuration to a low flow configuration. An embodiment of the invention comprises a valve body having a flow inlet, a flow outlet, and a communication portion formed between the flow inlet and the flow outlet. A ball is disposed within the communication portion of the valve body, where the ball is an oblong spheroid having a first axis and a second axis, with the first axis perpendicular to the second axis. The ball has a first passage axially aligned with the first axis and a second passage axially aligned with the second axis. The ball is positionable from a first position in which the first passage is in alignment with the flow inlet and the flow outlet, to a second position in which the second passage is in alignment with the flow inlet and the flow outlet. A first volume of a liquid passes through the valve body when the ball is in the first position and a second volume of the liquid passes through the valve body when the ball is in the second position. The first volume is significantly greater than the second volume. For example, the first volume may be at least twice as large as the second volume.

A shaft may be coupled to the ball, where rotation of the shaft actuates the ball from the first position to the second position. A ratcheting mechanism having a ratchet body having a ratchet wheel may be employed to change the ball from the first position to the second position to the first position, etc. The ratchet wheel is coupled to the shaft. The ratchet body has a pawl member which is pivotally attached to the ratchet body, wherein the pawl member engages the ratchet wheel upon rotation of the ratchet wheel.

An actuation member such as a string, cord, chain, or rod may be attached to the ratchet body to facilitate the actuation of the ratchet. In operation, and assuming the ball is in the first position or full flow position, a downward pull on the actuation member will typically cause a quarter turn in the shaft, causing the ball to rotate into the second position, such that the smaller sized second passage will be in alignment with the flow inlet and flow outlet. A biased pawl may be used to lock the shaft in this low flow position. In this second position, the water flow through the show head will be reduced, although some water flow will be maintained to the comfort of the user. When the user is ready for a return of full flow, the actuation member may be actuated again and the ball is rotated ninety degrees returning the valve, and thus the shower head, to the full flow position.

DETAILED DESCRIPTION OF THE EMBODIMENTS

Figure 1:
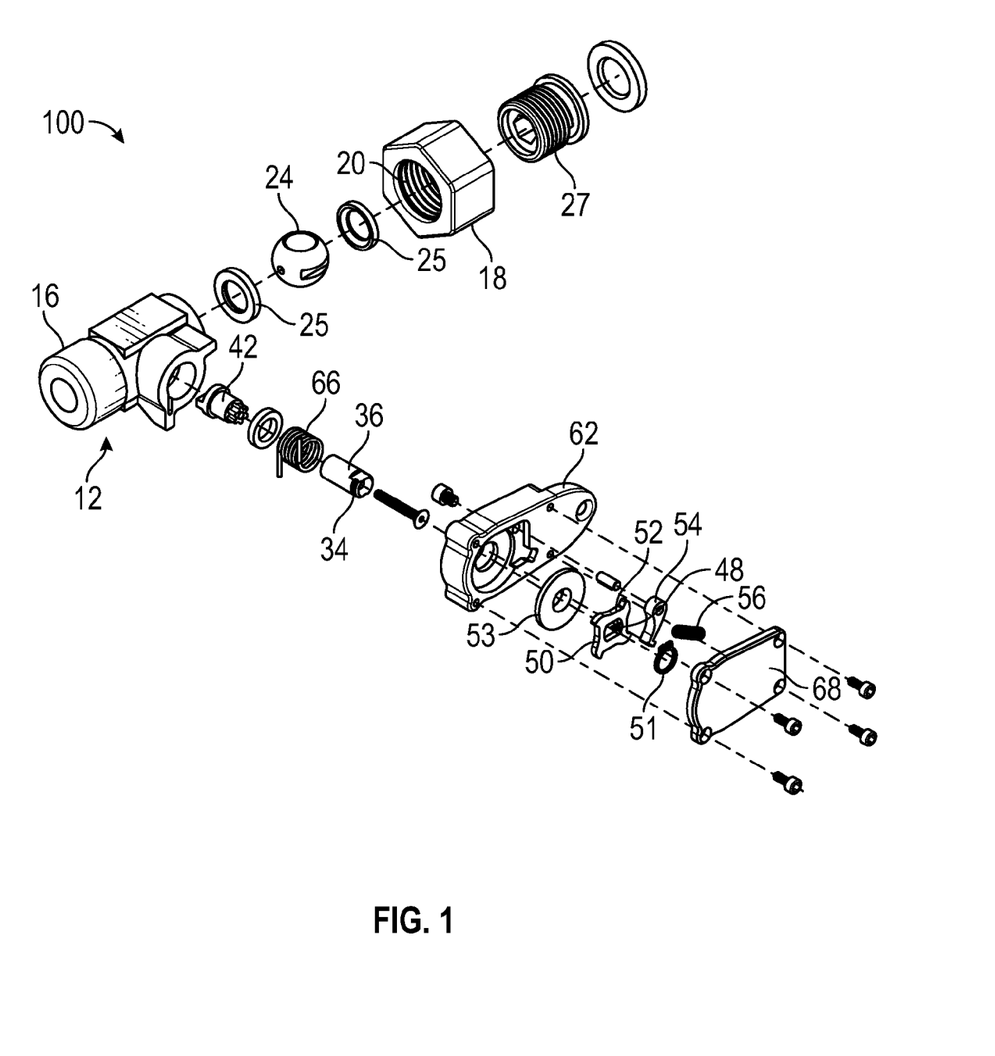
FIG. 1 shows an exploded view of an embodiment of the ratcheting shower head valve.
Figure 2:
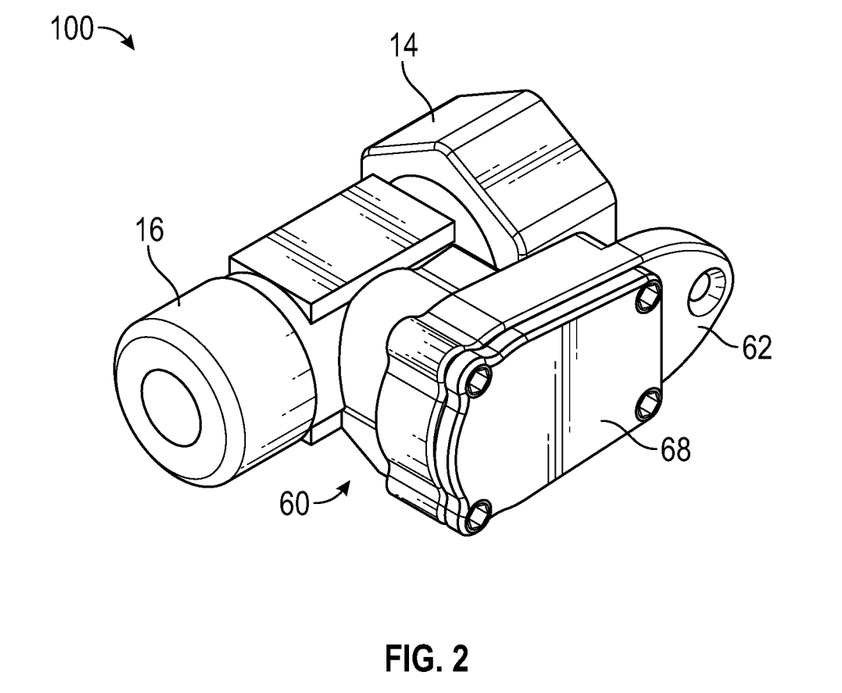
FIG. 2 shows an perspective view of the ratcheting shower head valve depicted in FIG. 1.
Figure 3:
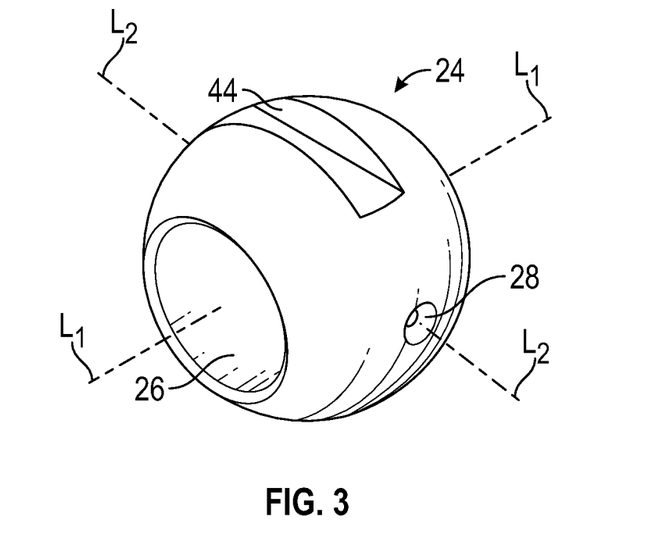
FIG. 3 shows a ball which may be utilized in embodiments of the ratcheting shower head valve.

Referring now to the Figures, FIG. 1 shows an exploded view of embodiment of the presently disclosed ratcheting shower head valve 10. The valve 10 comprises a valve body 12, having a flow inlet 14, and an outlet end 16. The flow inlet 14 will typically have coupler fitting 18 attached which has internal threads 20 for attaching to the male threads of a shower arm or gooseneck 100. The outlet end 16 will typically have external threads for making up into a shower head 102. Valve body 12 has a communication portion 22 formed between flow inlet 14 and outlet end 16 into which ball 24 is disposed.

Ball 24 is an oblong spheroid having a first axis $L_1$ and a second axis $L_2$, where $L_1$ and $L_2$ are normal or perpendicular to one another. Ball 24 has a first passage 26 which is in axial alignment with the first axis $L_1$ and ball 24 has a second passage 28 which is in axial alignment with the second axis L2. When disposed inside communication portion 22, ball 24 is positionable from a first position in which the first passage 26 is in alignment with the flow inlet 14 and the outlet end 16 to a second position in which the second passage 28 is in alignment with the flow inlet 14 and the outlet end 16.

Figure 4:
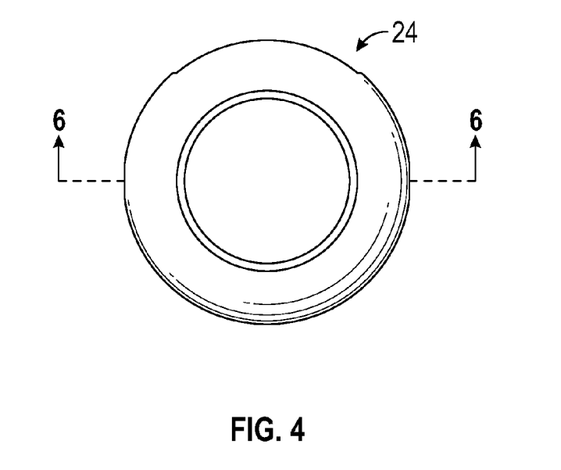
FIG. 4 shows a front view of the ball which may be utilized in embodiments of the ratcheting shower head valve.
Figure 5:
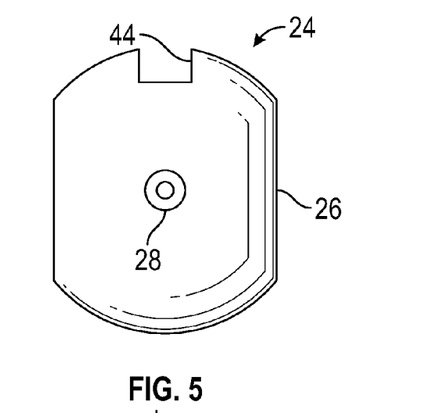
FIG. 5 shows a side view of the ball which may be utilized in embodiments of the ratcheting shower head valve.
Figure 6:
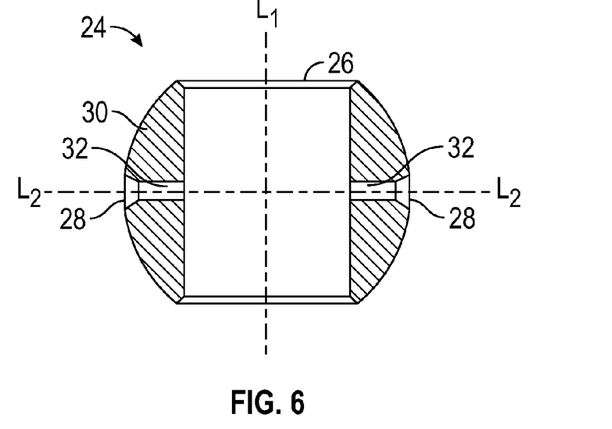
FIG. 6 shows a sectioned view of the ball which may be utilized in embodiments of the ratcheting shower head valve taken along line 6-6 of FIG. 4.
Figure 7:
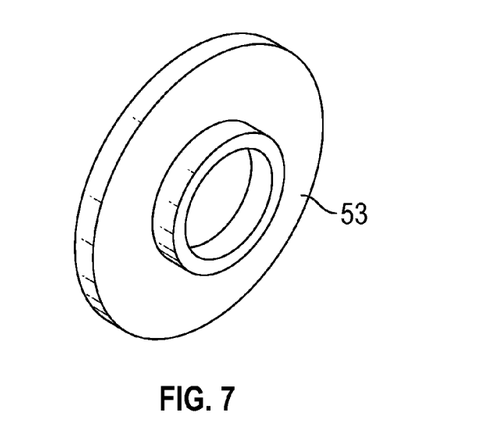
FIG. 7 shows a perspective view of a ratchet bushing which may be utilized in embodiments of the ratcheting shower head valve.
Figure 8:
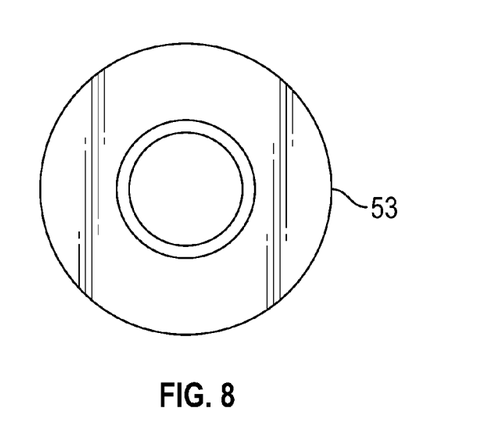
FIG. 8 shows a front view of the ratchet bushing of FIG. 7.
Figure 9:
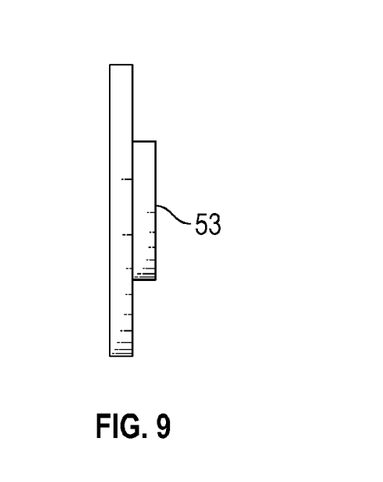
FIG. 9 shows a side view of the ratchet bushing of FIG. 7.
Figure 10:
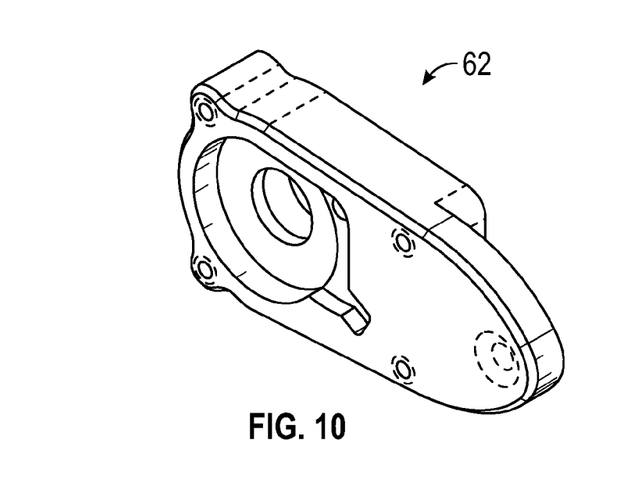
FIG. 10 shows a perspective front view of a ratchet which may be utilized in embodiments of the ratcheting shower head valve.
Figure 11:
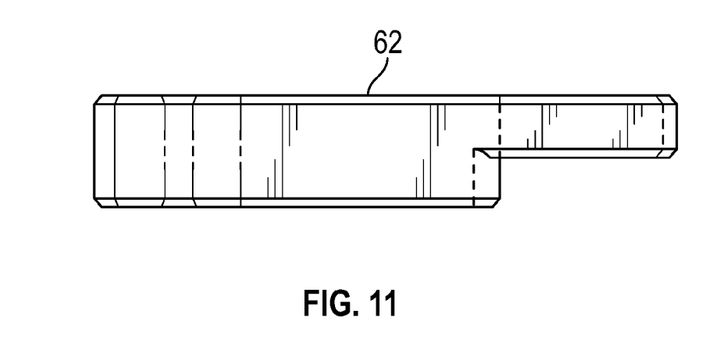
FIG. 11 shows a side view of the ratchet depicted in FIG. 10.
Figure 12:
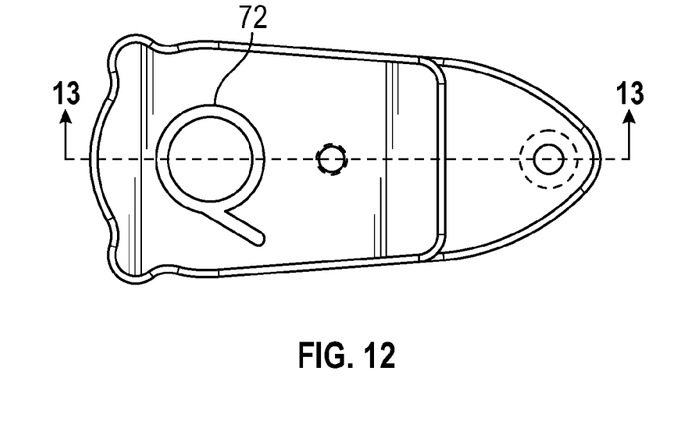
FIG. 12 shows a back view of the ratchet depicted in FIG. 10.
Figure 13:
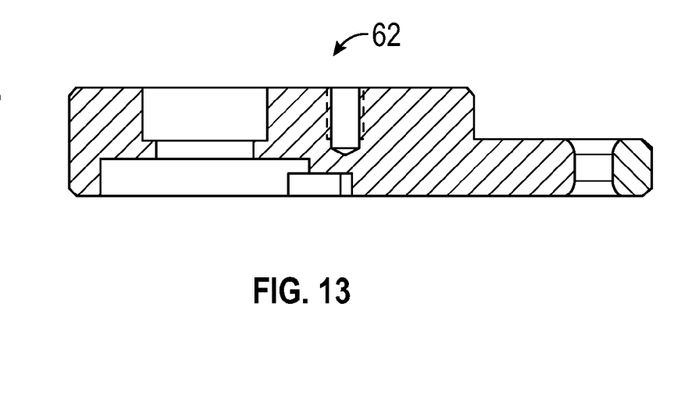
FIG. 13 shows a sectional view along line 13-13 from FIG. 12.
Figure 14:
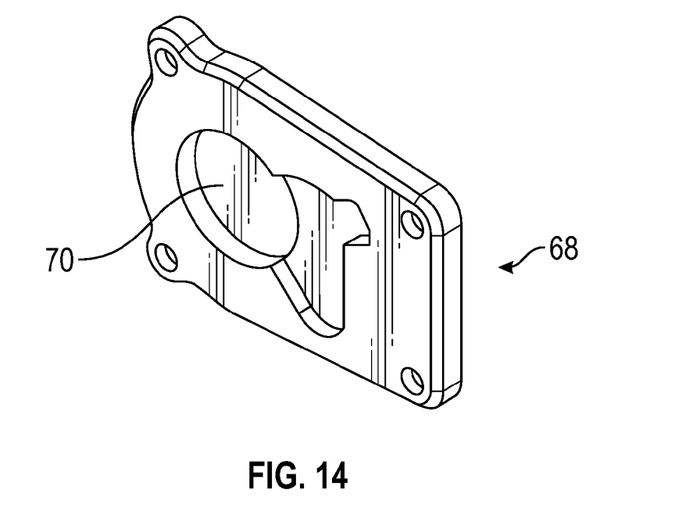
FIG. 14 shows a perspective view of the inside wall of ratchet cap which may be utilized in embodiments of the ratcheting shower head valve.
Figure 15:
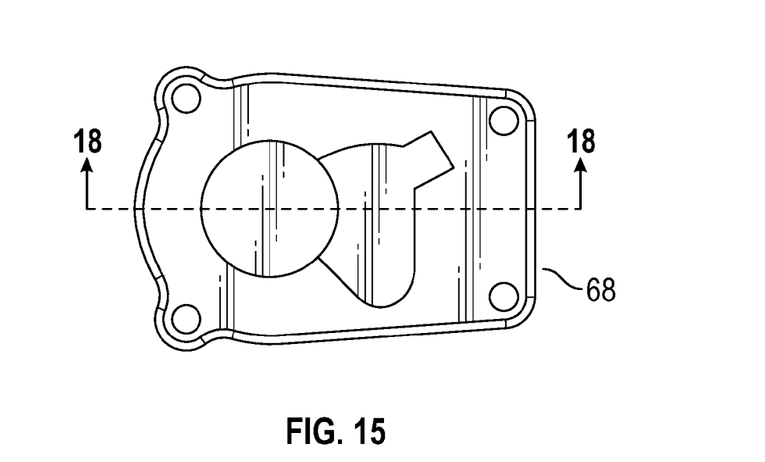
FIG. 15 shows a front view of the inside wall of the ratchet cap which may be utilized in embodiments of the ratcheting shower head valve.
Figure 16:
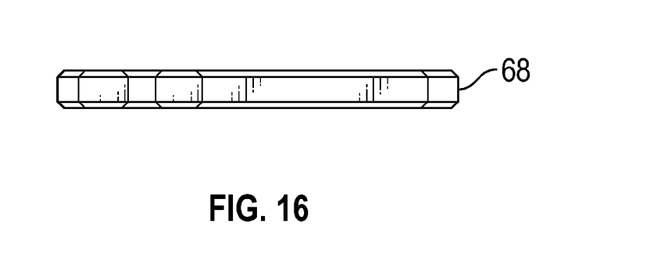
FIG. 16 shows a side view of the ratchet cap which may be utilized in embodiments of the ratcheting shower head valve.
Figure 17:
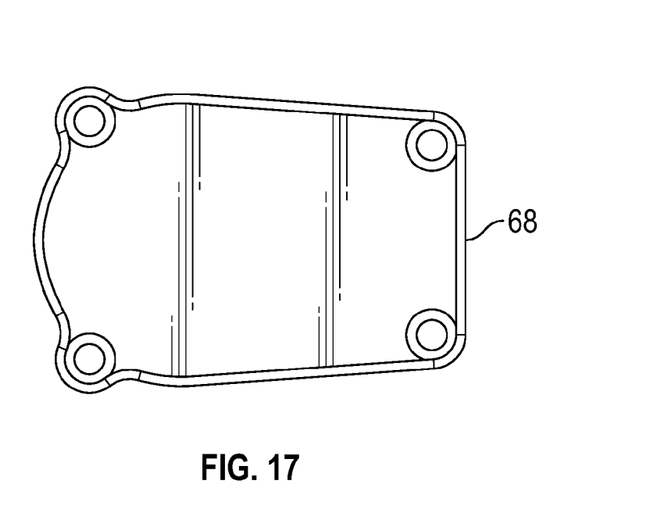
FIG. 17 shows a front view of the outside of the ratchet cap which may be utilized in embodiments of the ratcheting shower head valve.
Figure 18:
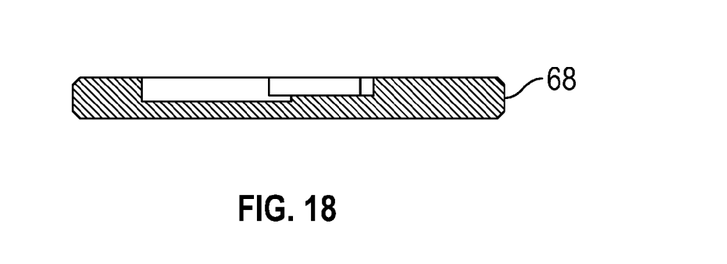
FIG. 18 shows a sectioned view of the ratchet cap taken along line 14-14 of FIG. 11.
Figure 19:
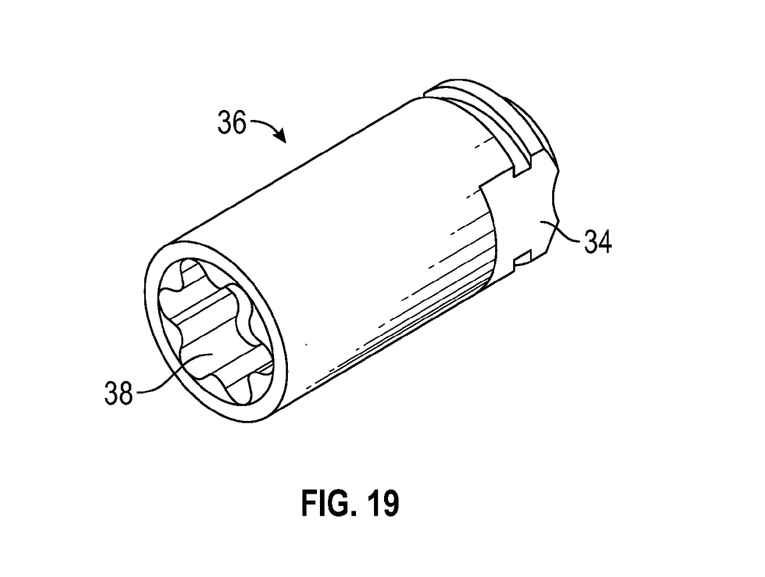
FIG. 19 shows a perspective view of a long section of a two-piece valve shaft utilized in embodiments of the ratcheting shower head valve.
Figure 20:
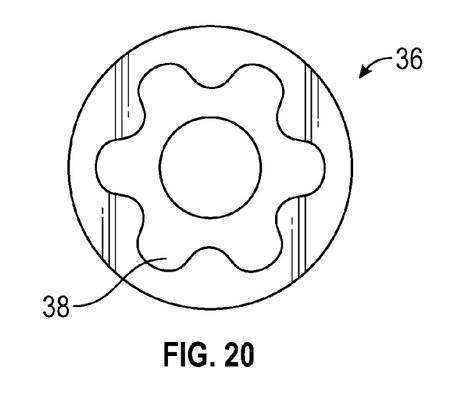
FIG. 20 shows the ball side of the long section of the two-piece valve shaft utilized in embodiments of the ratcheting shower head valve.
Figure 21:
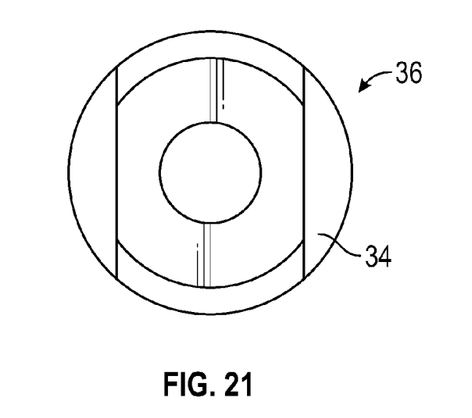
FIG. 21 shows the ratchet side of the long section of the two-piece valve shaft utilized in embodiments of the ratcheting shower head valve.
Figure 22:
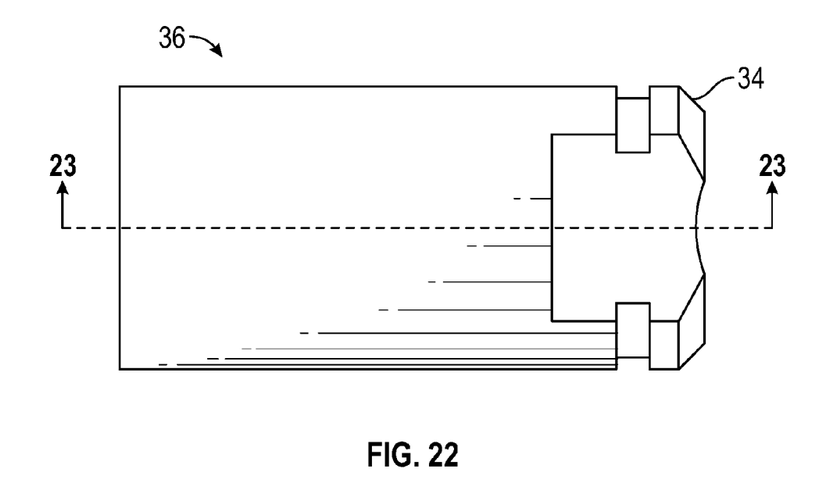
FIG. 22 shows a side view of the long section of the two-piece valve shaft utilized in embodiments of the ratcheting shower head valve.
Figure 23:
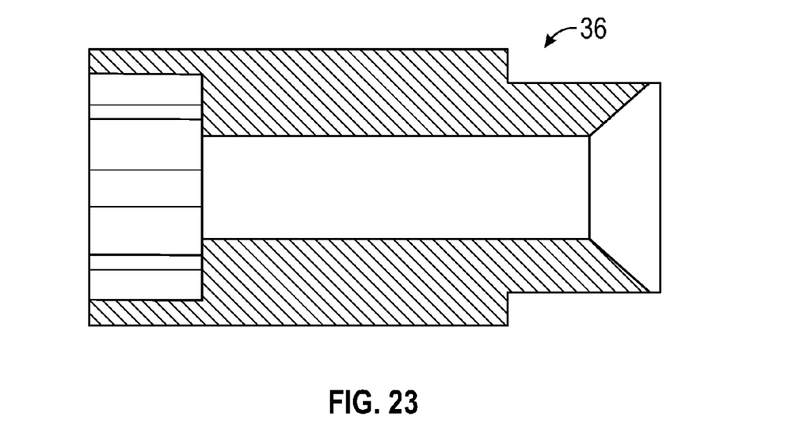
FIG. 23 shows a sectioned view taken along line 19-19 of FIG. 18 of the long section of the two-piece valve shaft utilized in embodiments of the ratcheting shower head valve.
Figure 24:
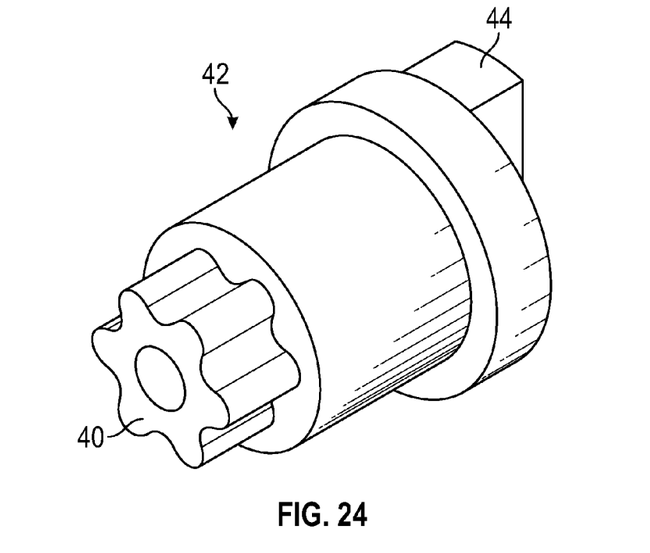
FIG. 24 shows perspective view of an adapter which may form a second section of a two-piece valve shaft utilized in embodiments of the ratcheting shower head valve.
Figure 25:
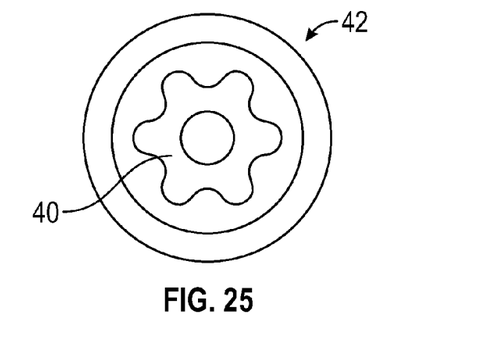
FIG. 25 shows a front view of the short section of the two-piece valve shaft utilized in embodiments of the ratcheting shower head valve.
Figure 26:
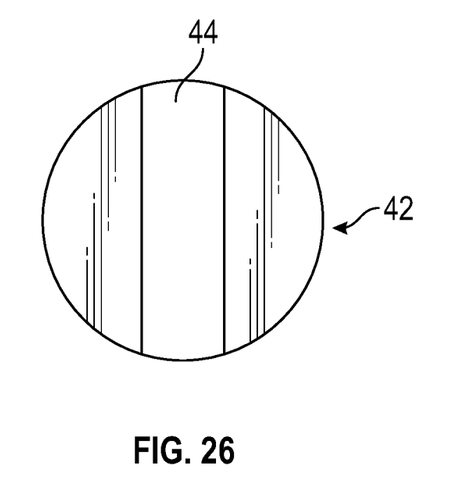
FIG. 26 shows a rear view of the short section of the two-piece valve shaft utilized in embodiments of the ratcheting shower head valve.
Figure 27:
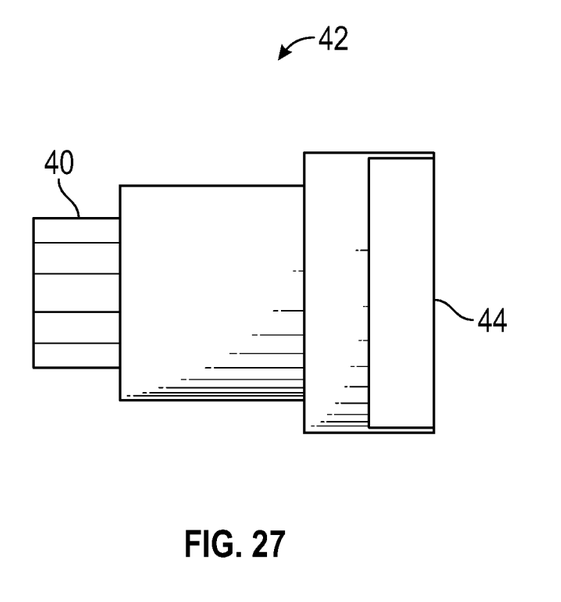
FIG. 27 shows a side view of the short section of the two-piece valve shaft utilized in embodiments of the ratcheting shower head valve.

As shown best in FIGS. 4-5, first passage 26 extends through the shorter dimension of the oblong spheroid of ball 24, while second passage 28 penetrates through each of the walls 30 which define first passage 28. First passage 26 provides a diameter which approaches or achieves a full open diameter through valve body 12 such that there is little flow restriction for a fluid flowing through first passage 26. In contrast, second passage 28 has a reduced diameter section 32 through each of the walls 30. A fluid flowing through second passage 28 is restricted by the reduced diameter section. A first volume of fluid which flows through the first passage 26 for a fixed time will be at least twice as large as a second volume of fluid which flows through the second passage 28 for the same period of time.

Ball 24 may be actuated within communication portion 22 from the first position to the second position by the rotation of a shaft 36. Shaft 36 is shown in greater detail in FIGS. 19-23. Shaft 36 may have an internal profile 38 which is configured to receive male end 40 of adapter 42. Together with shaft 36, adapter 42 may be used to form a two-piece valve shaft utilized to rotate ball 24. Ball 24 may have a shaft engagement structure 44 which is configured to accept an engagement end 44 of adapter 42. Shaft 36 may have an external profile 34 which is configured to receive an opening 48 in ratchet wheel 50. Ratchet wheel 50 may be retained on shaft 36 by retainer clip 51 and pressed against ratchet bushing 53 As set within communication portion 22, ball 24 is disposed between valve seats 25 on either side of the ball and held in place by threaded bushing 27

Ratchet wheel 50 is a component of a ratcheting mechanism 60 which, upon activation, sequentially rotates ball 24 from the first position to the second position and back again to the first position. Ratchet wheel 50 has at least one outwardly radiating catch member 52. As shown in FIG. 1, ratchet wheel 50 may have four outwardly radiating catch members 52. Ratcheting mechanism 60 may further comprise a pawl member 54 which is pivotally attached to the inside of ratchet body 62. Pawl 54 may be biased by spring 56 to ride upon the edge of ratchet wheel 50 and engage any one of catch members 52. As ratchet wheel 50 rotates, it in turn rotates shaft 36, adapter 42, and ball 24. Ratcheting mechanism 60 may be enclosed by ratchet cap 68. Ratchet cap 68 may have internal profile 70 which is configured to allow the free motion of the ratchet wheel 50 and pawl member 54.

Figure 28:
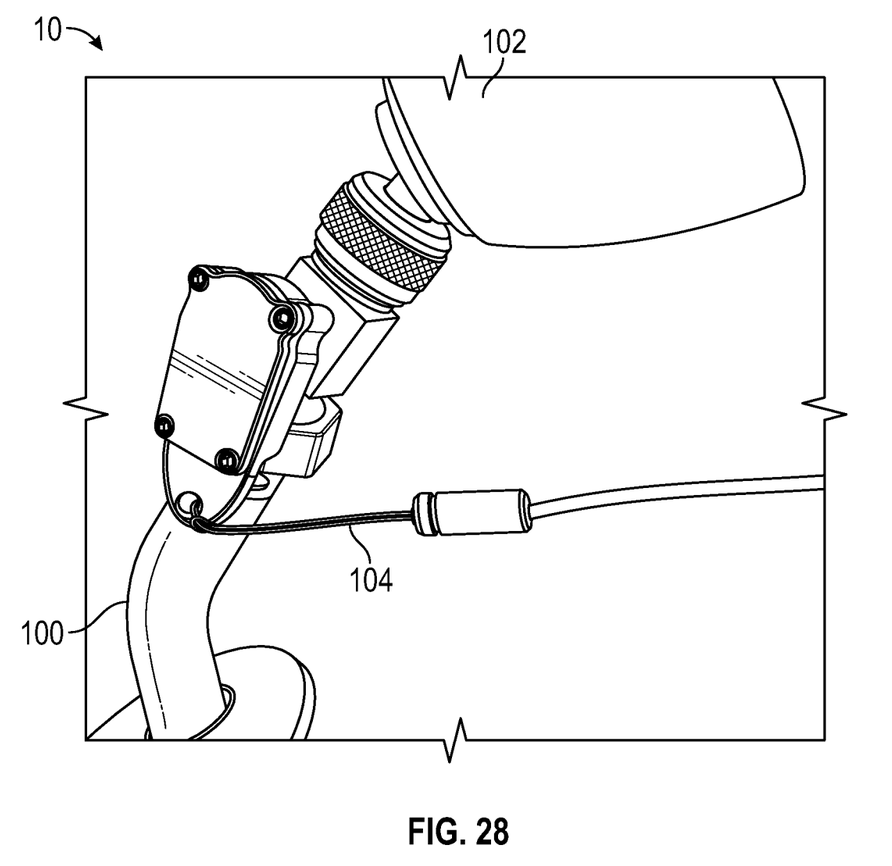
FIG. 28 shows an embodiment of the ratcheting shower head valve installed with a water supply and a shower head.

Ratcheting mechanism 60 is actuated by application of a force to ratchet body 62, typically by a downward force applied through an actuation member 104, such as that shown in FIG. 28. Each downward pull of actuation member 104 causes the partial rotation of actuation member 104 and the simultaneous rotation of ratchet wheel 50 and the turning of shaft 36, thereby rotating ball 24, to the effect that each pull of actuation member 104 causes a quarter rotation of ball 24. The result is that the valve 10 is switched back and forth between the low flow and high flow settings by a single pull on the actuation member 104. Ratchet body 64 is biased in an upward position by torsion spring 66 which may engage ratchet body 64 at spring catch 72.

While the above is a description of various embodiments of the present invention, further modifications may be employed without departing from the spirit and scope of the present invention. Thus the scope of the invention should not be limited according to these factors, but according to the following appended claims.

What is claimed is:

1. A ball valve comprising:
   a valve body having a flow inlet, a flow outlet, and a communication portion formed between the flow inlet and the flow outlet;

a ball disposed within the communication portion of the valve body, the ball comprising an oblong spheroid having a first axis and a second axis, the first axis perpendicular to the second axis, the ball having a first passage axially aligned with the first axis and a second passage axially aligned with the second axis, wherein the ball is positionable from a first position in which the first passage is in alignment with the flow inlet and the flow outlet, to a second position in which the second passage is in alignment with the flow inlet and the flow outlet, wherein for a first volume of a liquid passing through the valve body when the ball is in the first position for a fixed time and a second volume of the liquid passing through the valve body when the ball is in the second position for the fixed time, the first volume is at least twice as large as the second volume; a shaft coupled to the ball, wherein rotation of the shaft actuates the ball from the first position to the second position; and a ratcheting mechanism comprising a ratchet body comprising a ratchet wheel coupled to the shaft, the ratchet body further comprising a pawl member pivotally attached to the ratchet body, wherein the pawl member engages at least one outwardly radiating catch member on the ratchet wheel upon rotation of the ratchet wheel.

2. The ball valve of claim 1 wherein rotation of the shaft actuates the ball from the second position to the first position.

3. The ball valve of claim 2 wherein the shaft actuates the ball by rotating in a single direction.

4. The ball valve of claim 1 wherein the flow inlet is coupled to a water supply line and the flow outlet is coupled to a shower head.

5. The ball valve of claim 2 wherein the flow inlet is coupled to a water supply line and the flow outlet is coupled to a shower head.

6. The ball valve of claim 5 wherein an actuation member is attached to the ratchet body.

\* \* \* \* \*